United States Patent
Teruhi et al.

(10) Patent No.: US 12,238,662 B2
(45) Date of Patent: Feb. 25, 2025

(54) SYNCHRONIZATION METHOD AND INFORMATION APPARATUS

(71) Applicant: NIPPON TELEGRAPH AND TELEPHONE CORPORATION, Tokyo (JP)

(72) Inventors: Shigeru Teruhi, Musashino (JP); Kento Yoshizawa, Musashino (JP); Kazunori Akabane, Musashino (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 335 days.

(21) Appl. No.: 17/779,946

(22) PCT Filed: Dec. 2, 2019

(86) PCT No.: PCT/JP2019/046982
§ 371 (c)(1),
(2) Date: May 25, 2022

(87) PCT Pub. No.: WO2021/111494
PCT Pub. Date: Jun. 10, 2021

(65) Prior Publication Data
US 2022/0417881 A1 Dec. 29, 2022

(51) Int. Cl.
*H04W 56/00* (2009.01)

(52) U.S. Cl.
CPC ................ *H04W 56/0015* (2013.01)

(58) Field of Classification Search
CPC ........... H04W 56/001; H04W 56/0015; H04W 12/037; G06F 13/00; H04J 3/0667; H04J 3/00
See application file for complete search history.

(56) References Cited

U.S. PATENT DOCUMENTS

| | | | | |
|---|---|---|---|---|
| 5,428,645 | A | * | 6/1995 | Dolev ................ G06F 1/14 375/354 |
| 2012/0136956 | A1 | * | 5/2012 | Khoury ............. H04J 3/0667 709/248 |

(Continued)

OTHER PUBLICATIONS

Quectel, BG96 AT Commands Manual, Chapter 6.16 AT + QLTS Obtain the Latest Time Synchronized Through Network, LTE Module Series, Rev.BG96_AT_Commands_Manual_V2.3, Jan. 25, 2019, p. 100.

*Primary Examiner* — Mohamed A Kamara
(74) *Attorney, Agent, or Firm* — Harness, Dickey & Pierce, P.L.C.

(57) ABSTRACT

A synchronization method includes: a first step of transmitting a query command a plurality of times to a communication device configured to perform time synchronization with a base station device connected to a mobile communication network, the query command requesting time information expressed in a first unit, the first unit being lower in accuracy than accuracy of the time synchronization established by the communication device; a second step of determining timing at which the time information obtained in response to the query command is updated; a third step of determining timing to transmit a next query command, based on the timing at which the time information is updated; and a fourth step of acquiring time information with higher accuracy than the first unit, based on time information obtained in response to the query command transmitted at the third step.

5 Claims, 3 Drawing Sheets

(56) References Cited

U.S. PATENT DOCUMENTS

| | | | | |
|---|---|---|---|---|
| 2013/0077659 A1* | 3/2013 | Okuda | .................. | H04J 3/0667 |
| | | | | 375/219 |
| 2015/0341881 A1* | 11/2015 | Hiltunen | ............... | H04W 56/00 |
| | | | | 370/350 |
| 2016/0065435 A1* | 3/2016 | Ito | ....................... | H04L 43/0864 |
| | | | | 375/358 |
| 2024/0356722 A1* | 10/2024 | Geng | ..................... | G06N 20/10 |

* cited by examiner

SYNCHRONIZATION METHOD AND INFORMATION APPARATUS

CROSS-REFERENCE TO RELATED APPLICATIONS

This application is a 371 U.S. National Phase of International Application No. PCT/JP2019/046982, filed on Dec. 2, 2019. The entire disclosure of the above application is incorporated herein by reference.

TECHNICAL FIELD

The present invention relates to a technique of time synchronization.

BACKGROUND ART

Recent widespread use of sensor networks and the like has led to an increasing demand for highly accurate time synchronization. Methods using the Global Positioning System (GPS) have been proposed as a solution to this demand. However, such methods cannot be employed in places where GPS radio waves cannot reach. For example, time synchronization using the GPS cannot be established in places such as indoors, areas under bridges, underground, and tunnels, because GPS radio waves cannot reach these places. Meanwhile, a demand exists for highly accurate time synchronization even in these places where GPS radio waves cannot reach.

The Network Time Protocol (NTP) may be used in places where GPS radio waves cannot reach. The NTP is a time synchronization protocol utilizing Ethernet® transmission. However, the NTP has a synchronization accuracy as low as on the order of milliseconds. Also, the NTP uses the Internet, which is a best effort network. Thus, the NTP does not offer an absolute guarantee and may have a very poor accuracy.

The Precision Time Protocol (PTP) is another protocol that uses Ethernet® transmission to perform highly accurate time synchronization. The PTP guarantees an accuracy in microseconds or less. However, the PTP establishes such highly accurate time synchronization by means of addition of highly accurate hardware timestamps and relays by compatible network apparatuses that accurately detect network propagation delays and correct them. Thus, the PTP requires special functions for all network apparatuses end to end.

In mobile communication networks such as the Long Term Evolution (LTE) network, highly accurate time synchronization is established between a terminal device and a base station. Radio waves used in mobile communication networks often extend beyond the reach of radio waves transmitted from GPS satellites. Thus, communications apparatuses (e.g., modems) connecting to the mobile communication network can establish highly accurate time synchronization even in places where GPS radio waves cannot reach. Additionally, a command to output synchronization information may be defined in these communication apparatuses connecting to the mobile communication network (e.g., see Patent Literature 1).

CITATION LIST

Non-Patent Literature

Non-Patent Literature 1: QUECTEL, "BG96 AT Commands Manual" LTE Module Series, Rev. BG96 AT_Commands_Manual_V2.3, Jan. 25, 2019 (Chapter 6.16 on page 100)

SUMMARY OF THE INVENTION

Technical Problem

However, the synchronization information provided in Non-Patent Literature 1 is second-by-second synchronization information, and synchronization information as accurate as less than a second is not provided. Thus, even with the presence of modems connecting to the mobile communication network, other information apparatuses cannot establish highly accurate time synchronization. As such, no technique has been provided for achieving economical yet highly accurate time synchronization in places where GPS radio waves cannot reach.

In view of these backgrounds, an object of the present invention is to provide a technique that can establish more economical yet more accurate time synchronization even in places where GPS radio waves cannot reach.

Means for Solving the Problem

An aspect of the present invention is a synchronization method including: a first step of transmitting a query command a plurality of times to a communication device configured to perform time synchronization with a base station device connected to a mobile communication network, the query command requesting time information expressed in a first unit, the first unit being lower in accuracy than accuracy of the time synchronization established by the communication device; a second step of determining timing at which the time information obtained in response to the query command is updated; a third step of determining timing to transmit a next query command, based on the timing at which the time information is updated; and a fourth step of acquiring time information with higher accuracy than the first unit, based on time information obtained in response to the query command transmitted at the third step.

Another aspect of the present invention is an information apparatus including: a control unit configured to: transmit a query command a plurality of times to a communication device configured to perform time synchronization with a base station device connected to a mobile communication network, the query command requesting time information expressed in a first unit, the first unit being lower in accuracy than accuracy of the time synchronization established by the communication device; determine timing at which the time information obtained in response to the query command is updated; determine timing to transmit a next query command, based on the timing at which the time information is updated; and acquire time information with higher accuracy than the first unit, based on time information obtained in response to the query command transmitted.

Effects of the Invention

The present invention can establish more economical yet more accurate time synchronization even in places where GPS radio waves cannot reach.

DESCRIPTION OF EMBODIMENTS

An example of a receiver of the present invention will be described in detail with reference to the drawings.

Overview

Figure 1:
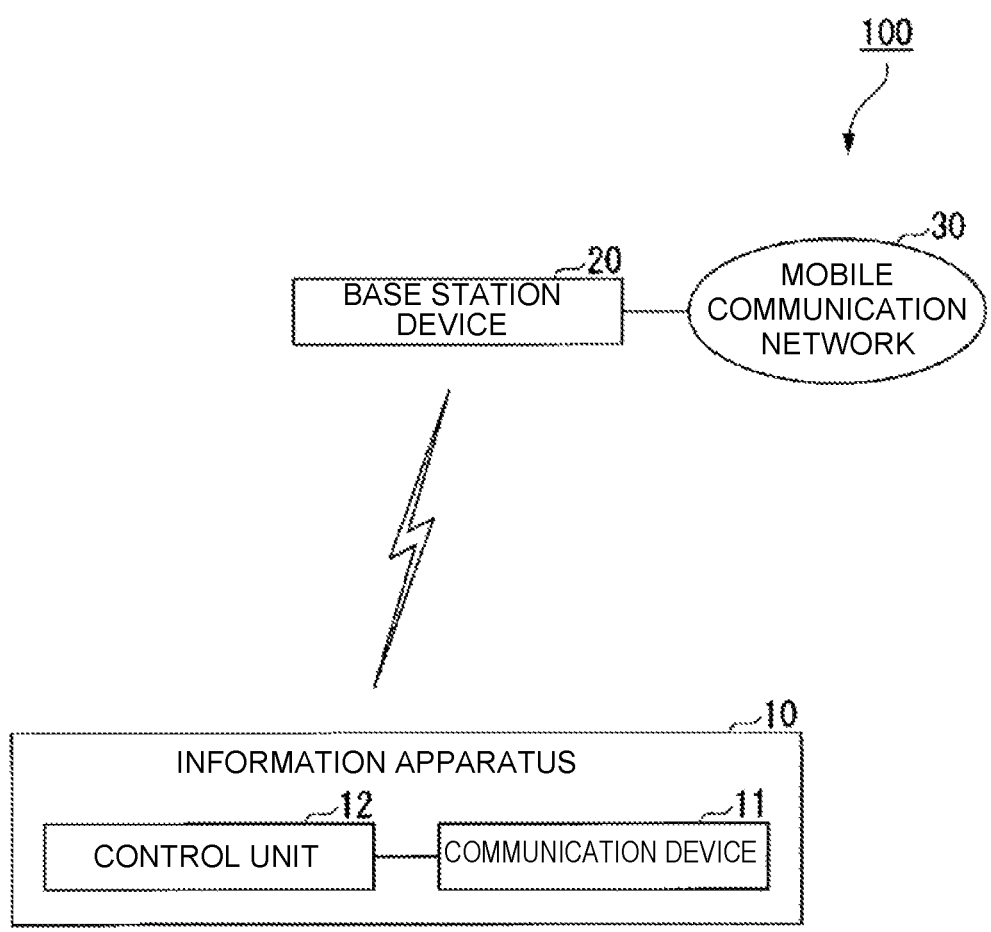
FIG. 1 is a schematic block diagram illustrating an overview of a functional configuration of a synchronization system 100 of the present invention.

FIG. 1 is a schematic block diagram illustrating an overview of a functional configuration of a synchronization system 100 of the present invention. First, an overview of the synchronization system 100 will be described. The synchronization system 100 of the present invention includes an information apparatus 10 and a base station device 20. A communication device 11 of the information apparatus 10 communicates with the base station device 20 to perform time synchronization. Highly accurate time synchronization is established by the communication device 11 based on a mobile communication network protocol. A control unit 12 transmits a query command for synchronization information to the communication device 11 a plurality of times with a period of less than one second to thereby acquire a plurality of pieces of synchronization information. The control unit 12 performs time synchronization based on timing at which a value representing a "second" included in the synchronization information changes. This process enables time synchronization with a period of less than one second (with higher accuracy). Hereinafter, details of the synchronization system 100 of the present invention will be described.

[Details]

The information apparatus 10 is a device to wirelessly communicate with the base station device 20. The base station device 20 is connected to a mobile communication network 30 and communicates with the information apparatus 10 based on a predetermined wireless communication protocol. Specific examples of the predetermined wireless communication protocol include the LTE and the LTE-Advanced (TD-LTE).

In the LTE-Advanced, required synchronization accuracy between base station devices 20 is within 1.5 microseconds from the coordinated universal time (UTC), as stipulated in G.8271 of the International Telecommunication Union-Telecommunication Standardization Sector (ITU-T). Further, time and phase synchronization accuracy on the order of several hundreds of nanoseconds is required in the coordinated multipoint transmission (CoMP). In the CoMP, it is defined that neighboring base station devices 20 exchange information about items such as the quality of communication with terminals (e.g., the information apparatus 10) to adjust power transmission and resource allocation to the base station devices 20.

In the LTE, the base station device 20 issues two synchronization signals with a period of several milliseconds, namely a primary synchronization signal (PSS) and a secondary synchronization signal (SSS). Based on these two synchronization signals, a communication apparatus of a terminal (e.g., the information apparatus 10) performs time synchronization with the base station device 20.

In this manner, highly accurate time synchronization is established between the base station device 20, which constitutes a mobile communication network, and the information apparatus 10 based on a wireless communication protocol for mobile communication.

The information apparatus 10 is a device to perform information processing. For example, the information apparatus 10 may be a sensor, a logger in a sensor network, or a user terminal. Specific examples of the user terminal include smartphones, mobile phones, tablets, personal computers, wearable terminals, gaming apparatuses, and household electronics. The information apparatus 10 includes the communication device 11 and the control unit 12.

For example, the communication device 11 is communication hardware such as a communication modem. The communication device 11 communicates with the base station device 20 based on a predetermined wireless communication protocol for mobile communication. As described above, the communication device 11 establishes highly accurate time synchronization with the base station device 20.

The control unit 12 is composed of a processor, such as a CPU, and a memory. The control unit 12 operates as the processor reads and executes a program stored in a storage device. The program may be recorded in a computer readable recording medium. The computer readable recording medium is, for example, a portable medium such as a flexible disk, a magneto-optical disk, a ROM, and a CD-ROM, or a non-transitory storage medium including a storage device such as a hard disk built in a computer system. The program may be transmitted via a telecommunications line. Some or all of operations of the control unit 12 may be implemented by hardware including an electronic circuit using an LSI, an ASIC, a PLD, an FPGA or the like.

The control unit 12 transmits a query command for synchronization information to the communication device 11 a plurality of times with a period of less than one second. For example, the query command is a command to query the communication device 11 about synchronization information corresponding to time synchronization performed between the communication device 11 and the base station device 20. In response to the query command, the communication device 11 outputs, to the control unit 12, time information with a unit of accuracy (hereinafter referred to as a "first unit") that is lower than the accuracy of time synchronization actually established by the communication device 11. For example, time information with one second accuracy may be outputted.

The control unit 12 refers to the synchronization information obtained in response to each query command. The control unit 12 performs time synchronization based on timing at which a value representing the first unit (e.g., "seconds") included in the synchronization information changes (specifically, increments). This process enables time synchronization with a unit of accuracy (hereinafter referred to as a "second unit") that is higher than the first unit. A specific example of such a process will be detailed below. In the following description, "seconds" are used as a specific example of the first unit for the sake of simple description.

The control unit 12 transmits the query command for synchronization information to the communication device 11 at intervals of time T. That is, the query command is transmitted with a period T. The period T is preferably shorter than a minimum number of seconds as the first unit (i.e., one second). Shorting the period T can shorten the time required for acquiring more accurate synchronization information. However, if the control unit 12 transmits a new query command before receiving a response signal to a preceding query command, overwriting of query commands may occur in the communication device 11. Such overwriting of query commands may lead to a failure to receive an accurate response signal. Thus, the period T may be set based on such trade-off relationship.

The control unit 12 repeats transmission of the query command until synchronization information associated with a response signal obtained from the communication device 11 is updated. Specifically, update of the synchronization information in this case means an increment of the value representing the first unit.

Once synchronization information associated with a response signal from the communication device 11 has been updated, the control unit 12 controls timing to transmit a next query command based on transmission time "P1" of the immediately preceding query command corresponding to that response signal and based on the period T. For example, the control unit 12 defines a value obtained by subtracting time T1 shorter than the period T (i.e., T>T1) from one second, which is the first unit, as differential time. Then, the control unit 12 may determine the timing after a lapse of the differential time from the transmission time "P1" of the immediately preceding query command, as timing "P2" to transmit the next query command. T1 may be obtained in any way. For example, T1 may be obtained by dividing T by m, where m is an integer of 1 or more.

The control unit 12 determines timing "P3" to transmit a next query command, based on synchronization information associated with a response signal received in response to the query command transmitted at the timing "P2". Specific operations are as follows. The control unit 12 defines a value T2 that is even smaller than T1. For example, a value obtained by dividing T by m to the nth power (n is an integer of 1 or more) may be defined as T2. In this case, the value of "n" may be "2". That is, the timing at which updated synchronization information is obtained through repeated transmission of the query command in the period T may be defined as transmission time "Pn" where n=1, and the value of n may be incremented every time the query command is transmitted thereafter. The control unit 12 uses this value of T2 to determine the timing "P3".

When synchronization information associated with a response signal for the timing "P2" has been updated, the control unit 12 defines a value obtained by subtracting time T2 from one second, which is the first unit, as the differential time. Then, the control unit 12 may determine the timing after a lapse of the differential time from the transmission time "P2" of the immediately preceding query command, as the timing "P3" to transmit the next query command.

When synchronization information associated with a response signal for the timing "P2" has not been updated, the control unit 12 defines a value obtained by adding time T2 to one second, which is the first unit, as the differential time. Then, the control unit 12 may determine the timing after a lapse of the differential time from the transmission time "P2" of the immediately preceding query command, as the timing "P3" to transmit the next query command.

It should be noted that the value to which time T1 or time T2 is added or from which time T1 or time T2 is subtracted may be the minimum value of the first unit, i.e., one second, or may be another value of the first unit that is not the minimum value, such as two or three seconds. The control unit 12 repeats the above process (process of determining the timing "P3" based on the timing "P2" and transmitting the query command) a predetermined number of times while incrementing the value of n. The control unit 12 acquires time information based on synchronization information associated with the last response signal obtained by repeating the process.

Specific operations are as follows. The transmission time of the immediately preceding query command is defined as "Pn". The control unit 12 defines a value Tn that is even smaller than T(n−1) used in determining the transmission time of the immediately preceding query command. For example, a value obtained by dividing T by m to the nth power may be defined as Tn. The control unit 12 uses this value of Tn to determine time information.

When synchronization information associated with a response signal for the timing "Pn" has been updated, the control unit 12 defines a value obtained by subtracting time Tn from one second, which is the first unit, as the differential time. Then, the control unit 12 determines the timing after a lapse of the differential time from the transmission time "Pn" of the immediately preceding query command, as the timing to update the first unit (e.g., seconds).

When synchronization information associated with a response signal for the timing "P2" has not been updated, the control unit 12 defines a value obtained by adding time Tn to one second, which is the first unit, as the differential time. Then, the control unit 12 determines the timing after a lapse of the differential time from the transmission time "Pn" of the immediately preceding query command, as the timing to update the first unit (e.g., seconds).

Through the above process, it is possible to perform time synchronization with a period shorter than the first unit (with higher accuracy).

Figure 2:
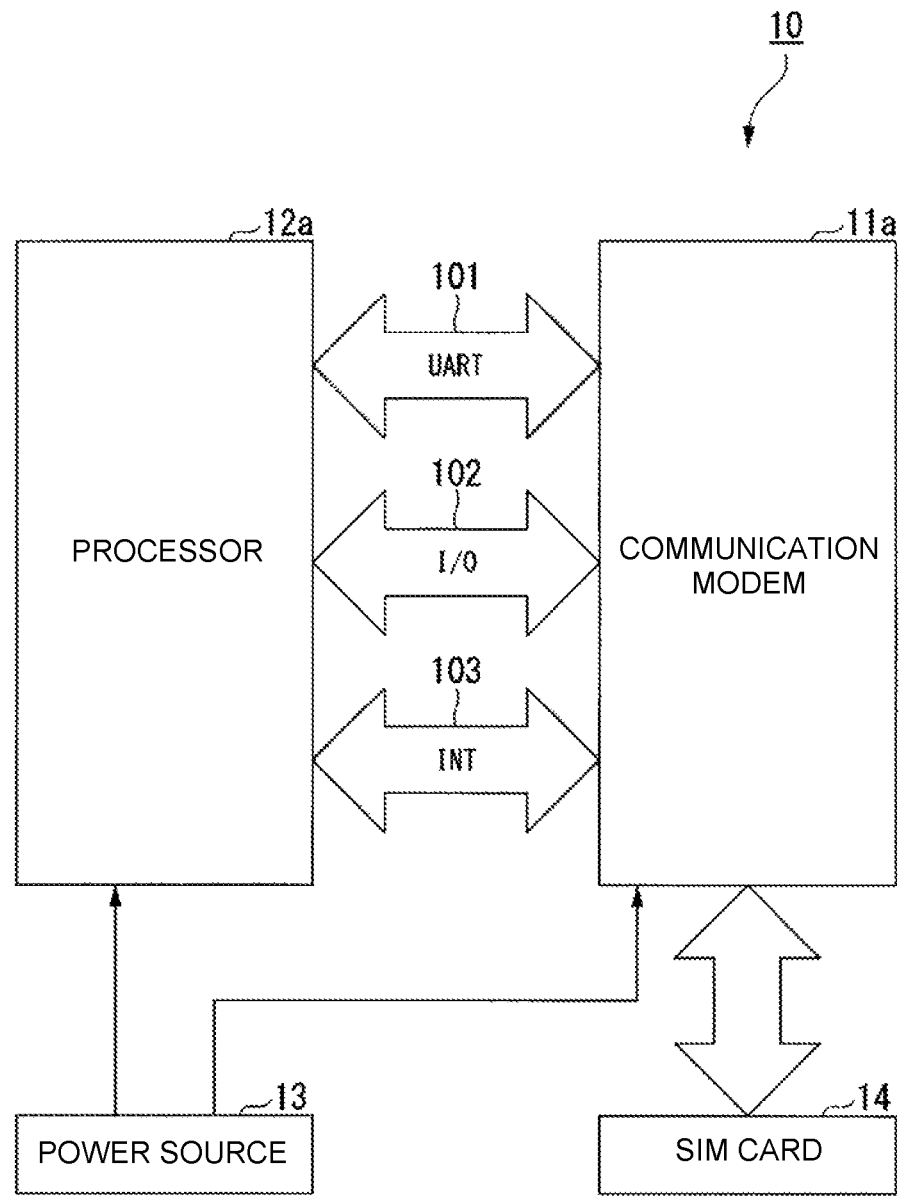
FIG. 2 illustrates a specific example of a hardware configuration of an information apparatus 10.

FIG. 2 illustrates a specific example of a hardware configuration of the information apparatus 10. The communication device 11 may be composed of a communication modem compatible with the LTE and the like, for example. The control unit 12 may be composed of a processor 12a such as a CPU, for example. Control by the query command and the response thereto is performed between a communication modem 11a and the processor 12a via, for example, a Universal Asynchronous Receiver/Transmitter (UART) interface 101. Flow control and the like are performed via an I/O interface 102. Interrupts such as wireless packet reception are performed via an INT interface 103. The communication modem 11a and the processor 12a are powered by a power source 13. A Subscriber Identity Module (SIM) card 14 is connected to the communication modem 11a. The communication modem 11a wirelessly communicates with the base station device 20 using information recorded in the SIM card 14.

Figure 3:
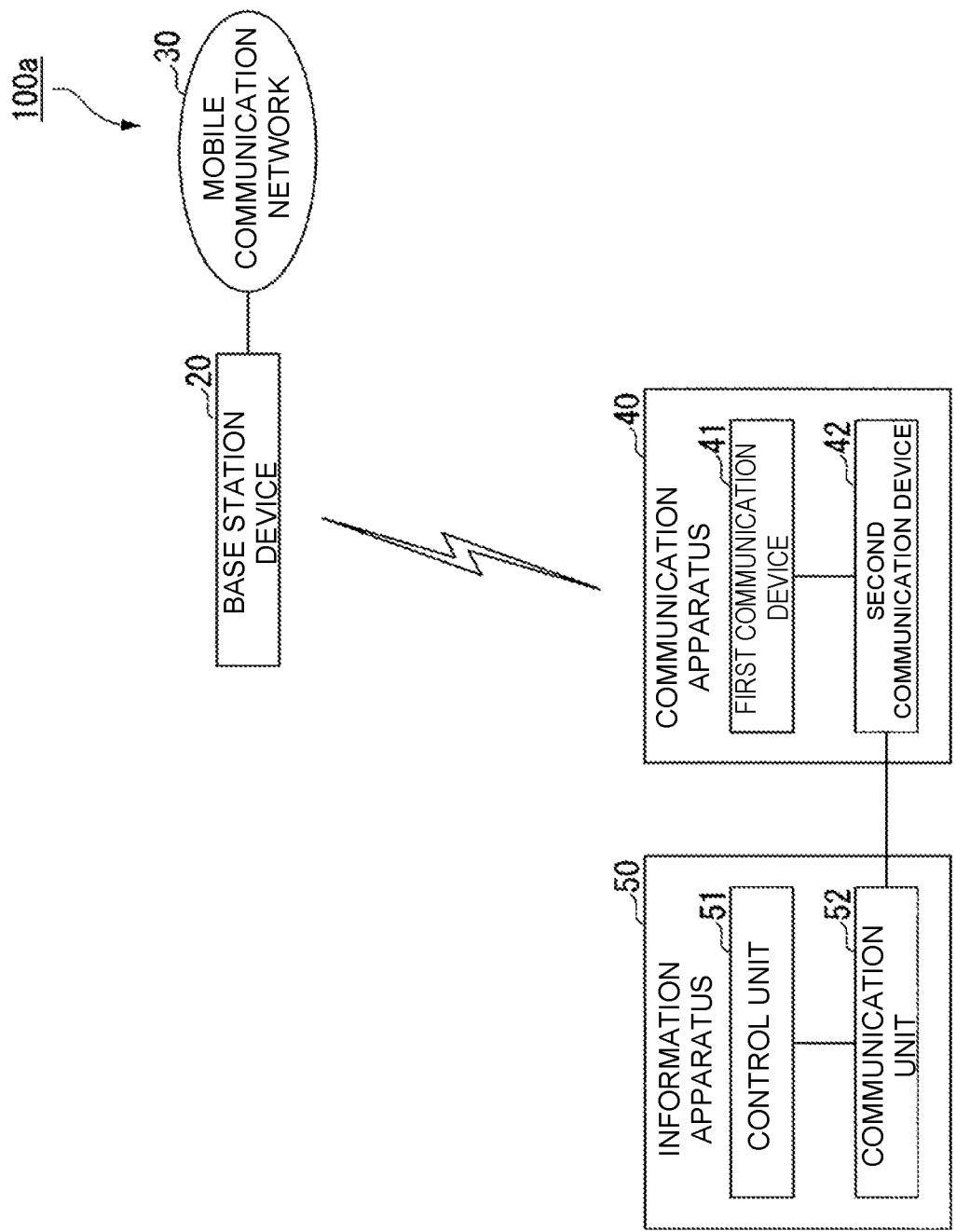
FIG. 3 illustrates an example configuration of a modification to the synchronization system 100.

FIG. 3 illustrates an example configuration of a modification (synchronization system 100a) to the synchronization system 100. In FIG. 1, the communication device 11 and the control unit 12 are provided in one information apparatus 10. That is, the communication device 11, which corresponds to the communication apparatus to establish highly accurate time synchronization with the base station device 20, and the control unit 12, which corresponds to the apparatus to transmit the query command to the communication device 11 to thereby acquire time information, are provided in the same device (information apparatus 10). On the other hand, in the example shown in FIG. 3, a first communication device 41, which corresponds to the communication apparatus to establish highly accurate time synchronization with the base station device 20, and a control unit 51, which corresponds to the apparatus to transmit the query command to the first communication device 41 to thereby acquire time information, are provided in different devices (a communication apparatus 40 and an information apparatus 50). The communication apparatus 40 and the information apparatus 50 communicate with each other via a second communication device 42 and a communication unit 52, respectively. Through this communication, the control unit 51 transmits the query command to the first communication device 41, and the control unit 51 acquires synchronization information from the first communication device 41. Communication of the second communication device 42 and the communication unit 52 may be wireless or wired. The modification configured in this way can also provide the same advantageous effects as the synchronization system 100 shown in FIG. 1.

Although the embodiment of the present invention has been described in detail with reference to the drawings, specific configurations are not limited to this embodiment, and design changes and other modifications may be made without departing from the scope of the present invention.

INDUSTRIAL APPLICABILITY

The present invention is applicable to systems using time synchronization.

REFERENCE SIGNS LIST 100, 100a Synchronization system
10 Information apparatus
11 Communication device
12 Control unit
13 Power source
14 SIM card
20 Base station device
30 Mobile communication network
101 UART interface
102 I/O interface
103 INT interface
40 Communication apparatus
41 First communication device
42 Second communication device
50 Information apparatus
51 Control unit
52 Communication unit

The invention claimed is:

1. A synchronization method comprising:
a first step of transmitting a query command a plurality of times to a communication device configured to perform time synchronization with a base station device connected to a mobile communication network, the query command requesting time information expressed in a first period, the first period being longer than a second period of the time synchronization established by the communication device;
a second step of determining timing at which the time information is updated, the time information being obtained in response to the query command;
a third step of determining timing to transmit a next query command, based on the timing at which the time information is updated; and
a fourth step of acquiring time information with a third period that is shorter than the first period, based on time information obtained in response to the query command transmitted at the third step.

2. The synchronization method according to claim 1, wherein the method comprises a plurality of the third steps, and
the fourth step acquires time information with a fourth period that is shorter than the first period, based on time information obtained in response to a query command transmitted at a last performed one of the third steps.

3. An information apparatus comprising:
a control unit configured to:
transmit a query command a plurality of times to a communication device configured to perform time synchronization with a base station device connected to a mobile communication network, the query command requesting time information expressed in a first period, the first period being longer than a second period of the time synchronization established by the communication device;
determine timing at which the time information is updated, the time information being obtained in response to the query command;
determine timing to transmit a next query command, based on the timing at which the time information is updated; and
acquire time information with a third period that is shorter than the first period, based on time information obtained in response to the query command transmitted.

4. The method of claim 1 wherein the method comprises performing the first-fourth steps in a location where global positioning system (GPS) radio waves cannot reach.

5. The method of claim 1 wherein the second period is less than one second.

* * * * *